United States Patent
Jung et al.

(10) Patent No.: US 7,439,586 B2
(45) Date of Patent: Oct. 21, 2008

(54) LIQUID CRYSTAL DISPLAY DEVICE AND FABRICATING METHOD THEREOF

(75) Inventors: Tae Young Jung, Gumi-si (KR); Ji No Lee, Goyang-si (KR); Hee Young Kwack, Seoul (KR)

(73) Assignee: LG Display Co., Ltd., Seoul (KR)

( * ) Notice: Subject to any disclaimer, the term of this patent is extended or adjusted under 35 U.S.C. 154(b) by 426 days.

(21) Appl. No.: 11/143,681

(22) Filed: Jun. 3, 2005

(65) Prior Publication Data

US 2005/0269638 A1   Dec. 8, 2005

(30) Foreign Application Priority Data

Jun. 5, 2004   (KR)   .................. 10-2004-0041137

(51) Int. Cl.
  *G02F 1/1339*   (2006.01)
(52) U.S. Cl. ................... 257/347; 257/59; 257/72; 257/48
(58) Field of Classification Search ........... 257/347, 257/59, 72, 48
  See application file for complete search history.

(56) References Cited

U.S. PATENT DOCUMENTS

| | | | |
|---|---|---|---|
| 4,653,864 A * | 3/1987 | Baron et al. | 349/156 |
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,764,324 A * | 6/1998 | Lu et al. | 349/113 |
| 5,771,083 A | 6/1998 | Fujihara et al. | |
| 5,793,460 A | 8/1998 | Yang | |
| 5,838,414 A * | 11/1998 | Lee | 349/157 |
| 5,847,781 A | 12/1998 | Ono et al. | |
| 6,424,401 B1 * | 7/2002 | Kang et al. | 349/153 |
| 6,690,445 B2 * | 2/2004 | Matsumoto | 349/155 |
| 6,967,703 B2 * | 11/2005 | Nam et al. | 349/153 |
| 7,084,849 B2 * | 8/2006 | Noguchi et al. | 345/96 |

* cited by examiner

*Primary Examiner*—Eugene Lee
(74) *Attorney, Agent, or Firm*—McKenna Long & Aldridge LLP

(57) ABSTRACT

A base thin film transistor (TFT) substrate includes a substrate, array areas on the substrate; at least one dummy area on the substrate and between the array areas; an insulating film on the substrate; at least one aperture through the insulating film and arranged within the at least one dummy area; and at least one post arranged within the at least one aperture.

7 Claims, 20 Drawing Sheets

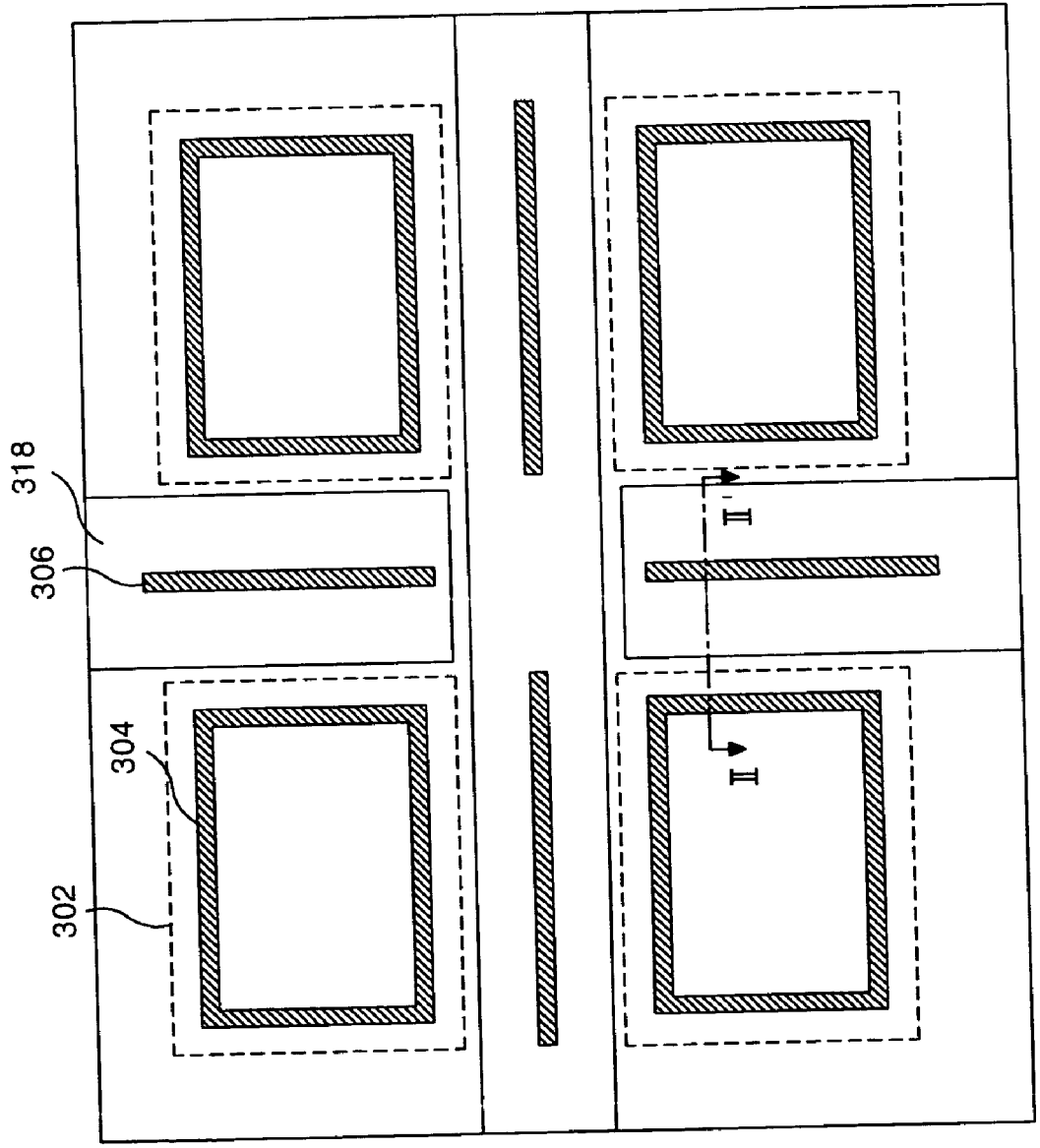

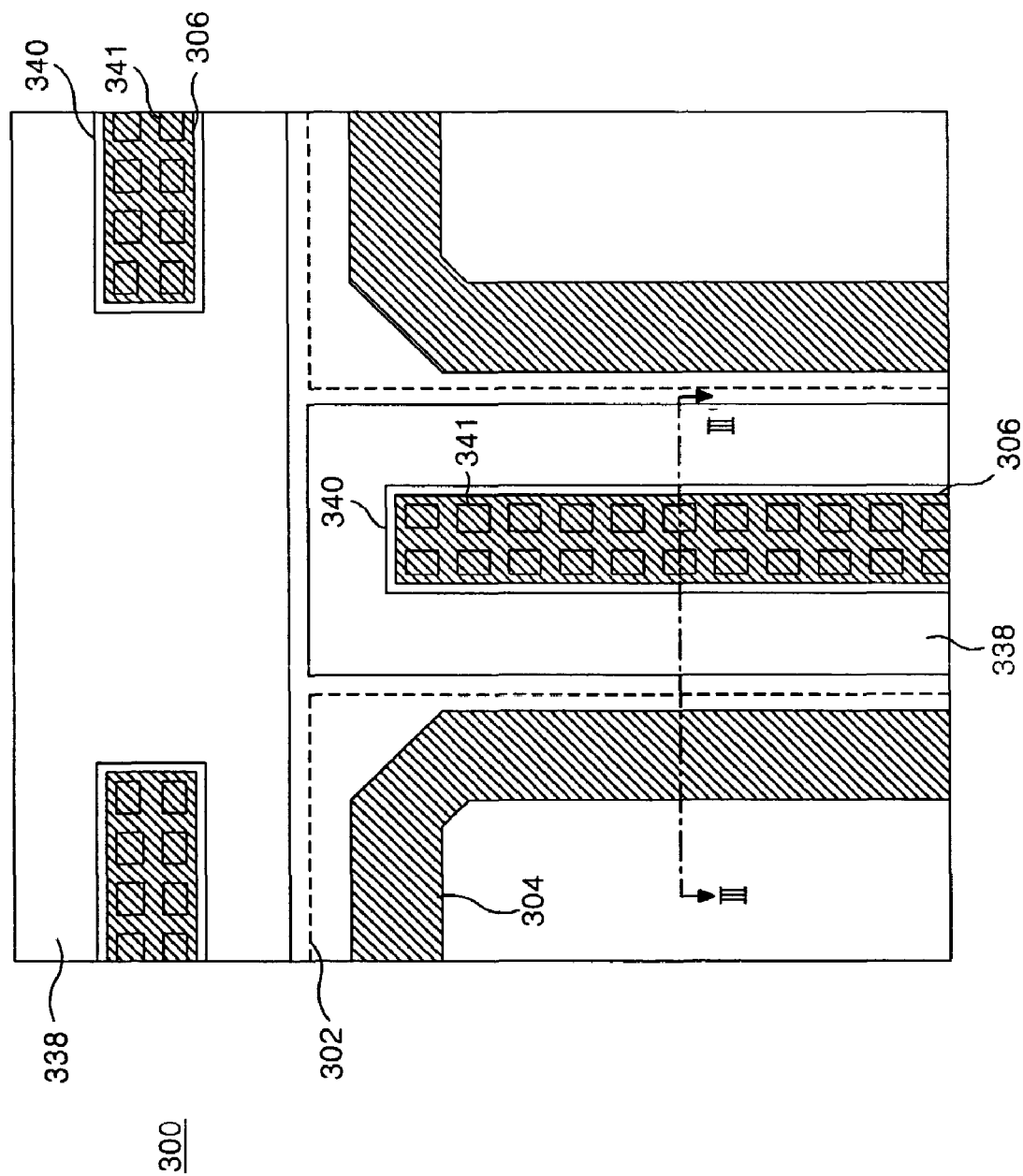

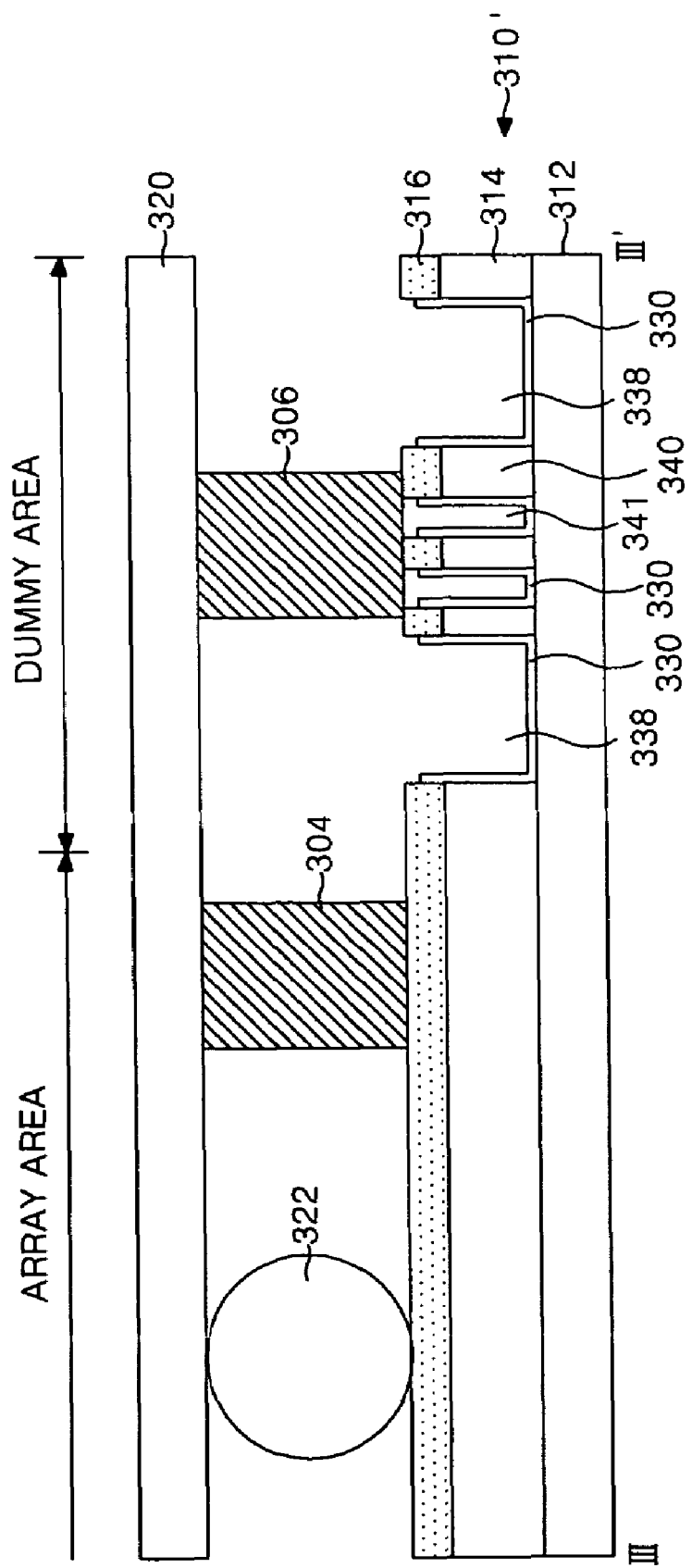

LIQUID CRYSTAL DISPLAY DEVICE AND FABRICATING METHOD THEREOF

This application claims the benefit of Korean Patent Application No. P2004-041137, filed on Jun. 5, 2004, which is hereby incorporated by reference for all purposes as if fully set forth herein.

BACKGROUND OF THE INVENTION

1. Field of the Invention

The principles of the present invention generally relate to thin film transistor (TFT) substrates of display devices and their methods of fabrication. More particularly, the principles of the present invention relate to a base TFT substrate and a simplified method of fabricating the same.

2. Discussion of the Related Art

Generally, LCD devices display pictures by controlling light transmittance characteristics of liquid crystal material via selectively applied electric fields. To this end, LCD devices typically include an LCD panel and driving circuits for driving the LCD panel.

The LCD panel has a plurality of liquid crystal cells arranged in a matrix pattern and generally includes a TFT substrate and a color filter substrate bonded to and spaced apart from the TFT substrates, thereby defining a cell gap between the two substrates. Liquid crystal material is provided within the cell gap as are spacers for maintaining cell gap uniformity.

The TFT substrate includes gate lines, data lines crossing the gate lines to define pixel areas, switching devices (i.e., TFTs) at crossings of the gate and data lines, pixel electrodes formed within the pixel areas and connected to corresponding TFTs, and an alignment film over the pixel electrodes. Each of the gate and data lines include pad portions that are electrically connected to predetermined driving circuits. Accordingly, the gate and data lines receive scanning and pixel signals, respectively, from the driving circuits via corresponding pad portions. In response to scanning signals applied to the gate lines, corresponding TFTs switch pixel signals, transmitted by corresponding data lines, to corresponding pixel electrodes.

The color filter substrate includes a plurality of color filters individually aligned over corresponding pixel electrodes, a black matrix between adjacent color filters for and reflecting external light, a common electrode for applying a reference voltage to a subsequently provided liquid crystal layer, and an alignment film over the common electrode.

After the aforementioned TFT array and color filter substrates are prepared, they are bonded together via a sealant material to form a cell gap, liquid crystal material is injected through an injection hole within the sealant material and into the cell gap to form the liquid crystal layer. Subsequently, the injection hole is subsequently sealed and fabrication of the LCD panel is complete.

The process used to fabricate the TFT array substrate described above is complicated and relatively expensive because it involves a number of semiconductor processing techniques that require a plurality of mask processes. It is generally known that a single mask process requires many sub-processes such as thin film deposition, cleaning, photo-lithography, etching, photo-resist stripping, inspection, etc. To reduce the complexity and cost associated with fabricating TFT array substrates, procedures have been developed to minimize the number masking process required. Accordingly, a four-mask process has been developed that removes the necessity of a mask process from a standard five-mask process.

FIG. 1 illustrates a plan view of a TFT array substrate of an LCD device, fabricated using a related art four-mask process. FIG. 2 illustrates a sectional view of the TFT array substrate taken along the I-I' line shown in FIG. 1.

Referring to FIGS. 1 and 2, the TFT array substrate includes gate lines 2 and data lines 4 formed so as to cross each other on a lower substrate 42 to define a plurality of pixel areas, a gate insulating film 44 between the gate and data lines 2 and 4, a TFT 6 provided each crossing of the gate and data lines 2 and 4, and a pixel electrode 18 provided at each pixel area. The TFT array substrate further includes a storage capacitor 20 provided at a region where each pixel electrode 18 and a previous gate line 2 overlap, a gate pad 26 connected to each gate line 2, and a data pad 34 connected to each data line 4.

Each TFT 6 allows a pixel signal transmitted by a corresponding data line 4 to be charged and maintained within a corresponding pixel electrode 18 in response to a scanning signal transmitted by a corresponding gate line 2. To this end, each TFT 6 includes a gate electrode 8 connected to a corresponding gate line 2, a source electrode 10 connected to a corresponding data line 4, a drain electrode 12 connected to a corresponding pixel electrode 18, and an active layer 14 overlapping the gate electrode 8 and defining a channel between the source electrode 10 and the drain electrode 12.

The active layer 14 is overlapped by the source and drain electrodes 10 and 12 of each TFT 6, the data lines 4, as well as a lower data pad electrode 36 and an upper storage electrode 22. An ohmic contact layer 48 is formed on the active layer 14 and ohmically contacts the data line 4, the source electrode 10, the drain electrode 12, the lower data pad electrode 36, and the upper storage electrode 22.

Each pixel electrode 18 is connected to a drain electrode 12 of a corresponding TFT 6 via a first contact hole 16 formed through a passivation film 50. During operation, a potential difference is generated between the pixel electrode 18 and a common electrode supported by a color filter substrate (not shown). In the presence of an electric field generated by the potential difference, molecules within the liquid crystal material (which have a particular dielectric anisotropy), rotate to align themselves vertically between the TFT array and color filter substrates. The magnitude of the applied electric field determines the extent of rotation of the liquid crystal molecules. Accordingly, various gray scale levels of light emitted by a light source (not shown) may be transmitted by a pixel area by varying the magnitude of the applied electric field.

Each storage capacitor 20 associated with a pixel area includes a previous gate line 2, an upper storage electrode 22 overlapping with the previous gate line 2 and separated from the previous gate line 2 by the gate insulating film 44, the active layer 14, and the ohmic contact layer 48. A pixel electrode 18 is connected to the upper storage electrode 22 via a second contact hole 24 formed through the passivation film 50. Constructed as described above, the storage capacitor 20 allows pixel signals charged within the pixel electrode 18 to be uniformly maintained until a next pixel signal is charged at the pixel electrode 18.

Each gate line 2 is connected to a gate driver (not shown) via a corresponding gate pad 26. Accordingly, each gate pad 26 consists of a lower gate pad electrode 28 and an upper gate pad electrode 32. The lower gate pad electrode 28 is an extension of the gate line 2 and is connected to the upper gate pad electrode 32 via a third contact hole 30 formed through the gate insulating film 44 and the passivation film 50.

Each data line 4 is connected to a data driver (not shown) via a corresponding data pad 34. Accordingly, each data pad 34 consists of a lower data pad electrode 36 and an upper data pad electrode 40. The lower data pad electrode 36 is an extension of the data line 4 and is connected to the upper data pad electrode 40 via a fourth contact hole 38 formed through the passivation film 50.

Having described the TFT array substrate above, a method of fabricating the TFT array substrate according to the related art four-mask process will now be described in greater detail with reference to FIGS. 3A to 3D.

Referring to FIG. 3A, a gate metal pattern, including the gate line 2, the gate electrode 8, the lower gate pad electrode 28, is formed on the lower substrate 42 in a first mask process.

Specifically, a gate metal layer is formed over the entire surface of the lower substrate 42 via a deposition technique such as sputtering. The gate metal layer may have a single- or double-layered metal structure including chromium (Cr), molybdenum (Mo), an aluminum (Al) group metal, etc. After being deposited, the gate metal layer is patterned using photolithography and etching techniques in conjunction with a first mask pattern to provide the aforementioned gate metal pattern.

Referring next to FIG. 3B, a gate insulating film 44 is coated over the entire surface of the lower substrate 42 and on the gate metal pattern. In a second mask process, a semiconductor pattern and a data metal pattern are provided on the gate insulating film 44. The semiconductor pattern consists of the active layer 14 and the ohmic contact layer 48. The data metal pattern consists of the data line 4, the source electrode 10, the drain electrode 12, the lower data pad electrode 36, and the upper storage electrode 22.

Specifically, the gate insulating film 44, a first and a second semiconductor layer, and a data metal layer are sequentially formed over the surface of the lower substrate 42 and on the gate metal pattern by deposition techniques such as plasma enhanced chemical vapor deposition (PECVD) and sputtering. The gate insulating film 44 typically includes an inorganic insulating material such as silicon nitride ($SiN_x$) or silicon oxide ($SiO_x$). The active layer 14 is formed from the first semiconductor layer and typically includes undoped amorphous silicon. The ohmic contact layer 48 is formed from the second semiconductor layer and typically includes an $n^+$ amorphous silicon layer. The data metal layer typically includes a material such as molybdenum (Mo), titanium (Ti), and tantalum (Ta).

After depositing the data metal layer, a photo-resist film (not shown) is formed and is photolithographically patterned using a second mask pattern. Specifically, the second mask pattern is provided as a diffractive exposure mask having a diffractive exposure region corresponding to a channel of a subsequently formed TFT. Upon exposure through the second mask pattern and development, a photo-resist pattern is created wherein a portion of the photo-resist film remaining in a region corresponding to the channel has a lower height relative to portions of the photo-resist film remaining in regions outside the channel.

Subsequently, the photo-resist pattern is used as a mask to pattern the data metal layer in a wet etching process, thereby forming the aforementioned data metal pattern, wherein the source and drain electrodes 10 and 12 are connected to each other in a region corresponding to the channel of the subsequently formed TFT 6. Next, the photo-resist pattern is used as a mask to sequentially pattern the first and second semiconductor layers in a dry etching process and form the aforementioned semiconductor pattern.

After the semiconductor pattern is formed, the portion of the photo-resist having the relatively lower height is removed from the region corresponding to the channel in an ashing process. Upon performing the ashing process, the relatively thicker portions of the photo-resist in regions outside the channel region are thinned but, nevertheless, remain. Using the remaining photo-resist pattern as a mask, the portion of the data metal layer and the ohmic contact layer 48 arranged in the channel region are then etched in a dry etching process. As a result, the active layer 14 within the channel region is exposed, the source electrode 10 is disconnected from the drain electrode 12, and the remaining photo-resist pattern is removed in a stripping process.

Referring next to FIG. 3C, the passivation film 50 is coated over the entire surface of the lower substrate 42, and on the gate insulting film 44, the data metal pattern, and the active layer 14. In a third mask process, the first to fourth contact holes 16, 24, 30, and 38, respectively, are formed.

Specifically, the passivation film 50 is formed over the surface of the lower substrate 42, and on the gate insulting film 44, the data metal pattern, and the active layer 14 via a deposition technique such as PECVD. The passivation film 50 typically includes an inorganic insulating material such as $SiN_x$ or $SiO_x$, or an organic material having a small dielectric constant such as an acrylic organic compound, benzocyclobutene (BCB) or perfluorocyclobutane (PFCB). The passivation film 50 is then patterned via an overlaying third mask pattern using photolithography and etching processes to thereby define the first to fourth contact holes 16, 24, 30 and 38.

The first contact hole 16 is formed through the passivation film 50 to expose the drain electrode 12, the second contact hole 24 is formed through the passivation film 50 to expose the upper storage electrode 22, the third contact hole 30 is formed through the passivation film 50 and the gate insulating film 44 to expose the lower gate pad electrode 28, and the fourth contact hole 38 is formed through the passivation film 50 to expose the lower data pad electrode 36.

Referring next to FIG. 3D, a transparent conductive pattern including the pixel electrode 18, the upper gate pad electrode 32, and the upper data pad electrode 40 are formed on the passivation film 50 in a fourth mask process.

Specifically, a transparent conductive material is coated over the entire surface of the passivation film 50 and within the first to fourth contact holes 16, 24, 30, and 38 via a deposition technique such as sputtering. The transparent conductive material typically includes indium-tin-oxide (ITO). In a fourth mask process, the transparent conductive material is patterned using photolithographic and etching techniques using a fourth mask pattern to thereby form the aforementioned transparent conductive pattern.

Accordingly, the pixel electrode 18 is electrically connected to the drain electrode 12 via the first contact hole 16 while also being electrically connected to the upper storage electrode 22, via the second contact hole 24. The upper gate pad electrode 32 is electrically connected to the lower gate pad electrode 28 via the third contact hole 30 and the upper data pad electrode 40 is electrically connected to the lower data pad electrode 48 via the fourth contact hole 38.

While the TFT array substrate described above may be formed using a four-mask process that is advantageous over previously known five-mask processes, the four-mask process can still be undesirably complicated and, therefore, costly. Accordingly, it would be beneficial to fabricate a TFT array substrate according to a less complex, and therefore less costly, process.

SUMMARY OF THE INVENTION

Accordingly, the present invention is directed to a liquid crystal display device and a method of fabricating the same that substantially obviates one or more of the problems due to limitations and disadvantages of the related art.

An advantage of the present invention provides a base TFT substrate and a method of fabricating the same in which the efficiency of a lift-off process is improved.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include a substrate; a plurality array areas on the substrate; at least one dummy area on the substrate and between the plurality of array areas; an insulating film on the substrate; at least one aperture through the insulating film and arranged within the at least one dummy area; and at least one post arranged within the at least one aperture.

In another aspect of the present invention, a method of fabricating a display device may, for example, include forming a plurality array areas on a first substrate, wherein the plurality of array areas are separated by at least one dummy area; forming an insulating film on the first substrate; forming at least one aperture through a portion of the insulating film arranged within the at least one dummy area; and forming at least one post arranged within the at least one aperture.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 illustrates a plan view of a base TFT array substrate bonded to a base color filter substrate according to a first embodiment of the present invention;

FIG. 8 illustrates a plan view of a base TFT array substrate bonded to a base color filter substrate according to a second embodiment of the present invention;

FIG. 9 illustrates a sectional diagram illustrating the initial panel shown in FIG. 8, taken along the line III-III' as shown in FIG. 8.

DETAILED DESCRIPTION OF THE ILLUSTRATED EMBODIMENTS

Reference will now be made in detail to embodiments of the present invention, examples of which are illustrated in the accompanying drawings.

Co-pending U.S. patent application Ser. No. 10/969,869, the disclosure of which is hereby incorporated by reference for all purposes as if fully set forth herein, can be understood to disclose a method of fabricating a TFT according to a three-mask process.

In the third mask process of the three-mask process disclosed in the co-pending application, a transparent conductive film is coated over the entire surface of a photo-resist pattern that has been used to form various contact holes within passivation and gate insulating films. Subsequently, the photo-resist pattern is removed according to a lift-off process and, as a result, the transparent conductive film is also patterned. Although not shown, stripper penetration paths can be provided between and over wirings (e.g., gate lines, data lines, power transmission lines, signal transmission lines, etc.) to facilitate penetration of a stripper solution into the photo-resist pattern, over which the transparent conductive film is coated, and increase the efficiency of the lift-off process. When the stripper solution infiltrates the photo-resist pattern through the stripper penetration paths, removal (i.e., lift-off) of the photo-resist pattern from the passivation film may be facilitated.

Figure 1:
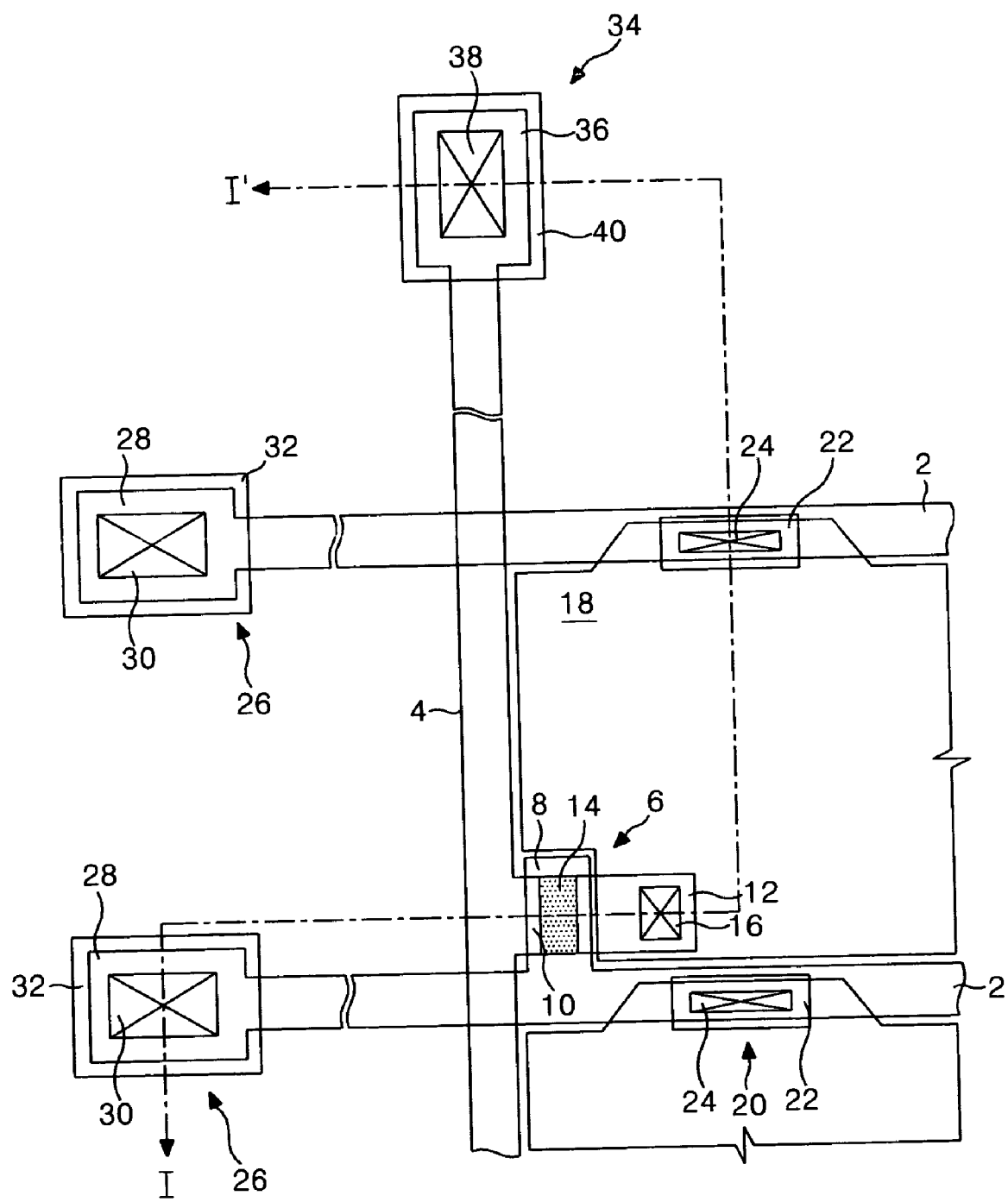
FIG. 1 illustrates a plan view of a thin film transistor (TFT) array substrate, fabricated using a related art four-mask process.
Figure 2:
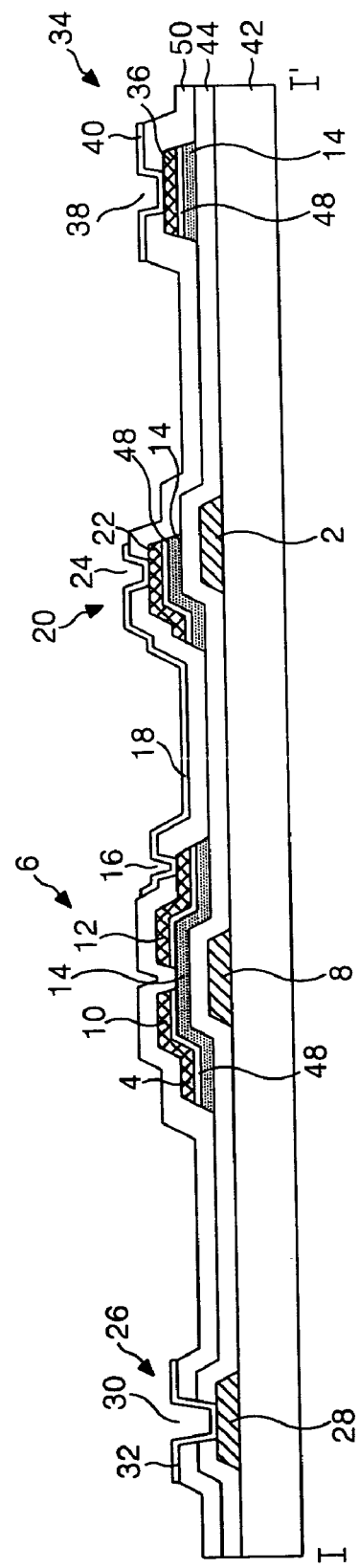
FIG. 2 illustrates a sectional view of the TFT array substrate taken along line I-I' shown in FIG. 1.
Figure 3A:
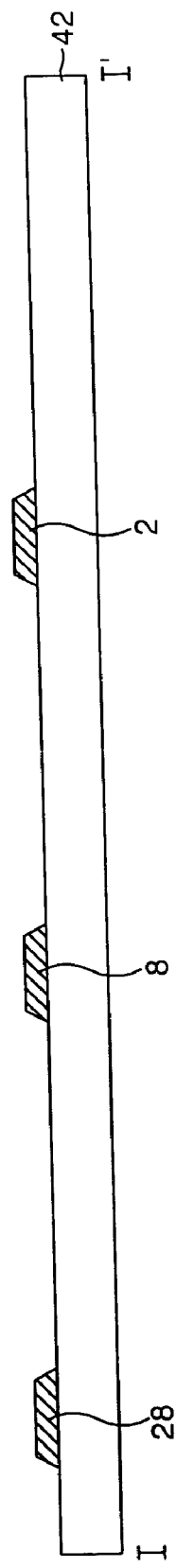
FIGS. 3A to 3D illustrate a method of fabricating the TFT array substrate shown in FIG. 2.
Figure 3B:
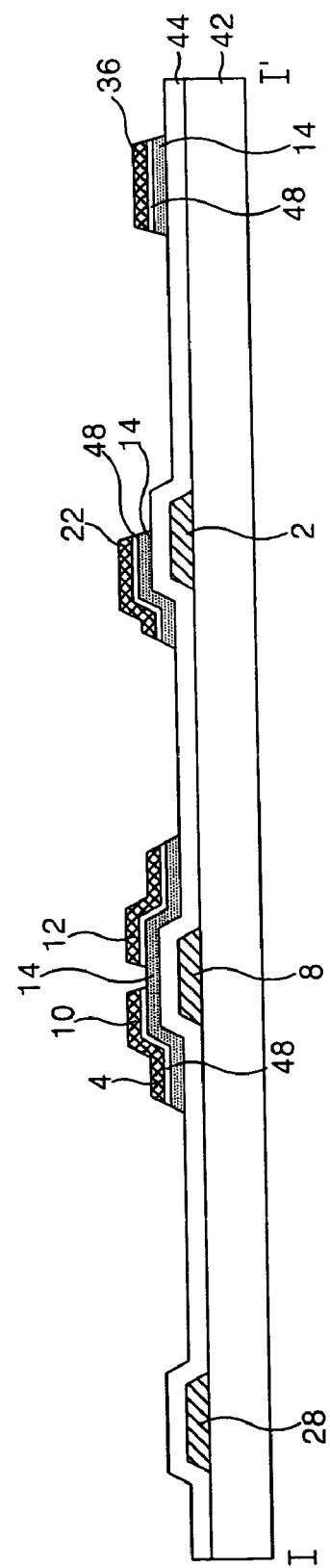
Figure 3C:
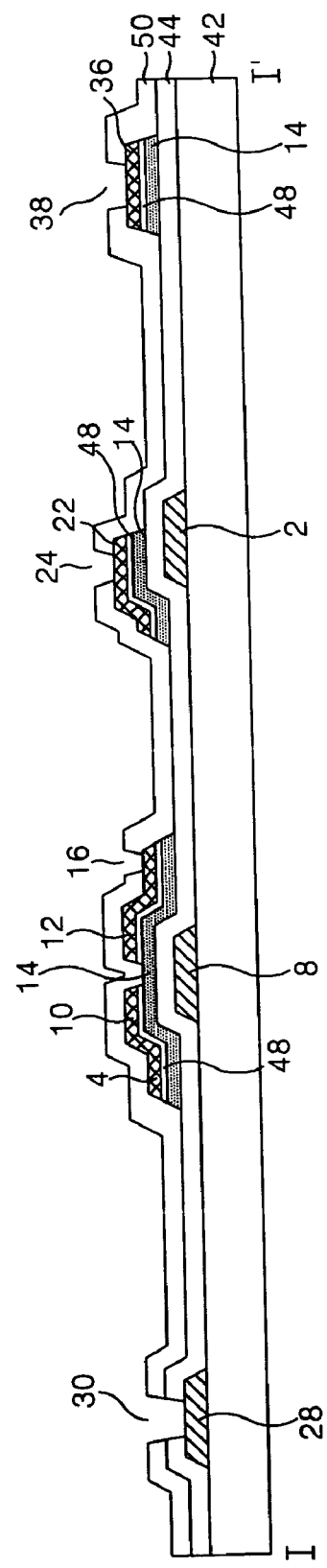
Figure 3D:
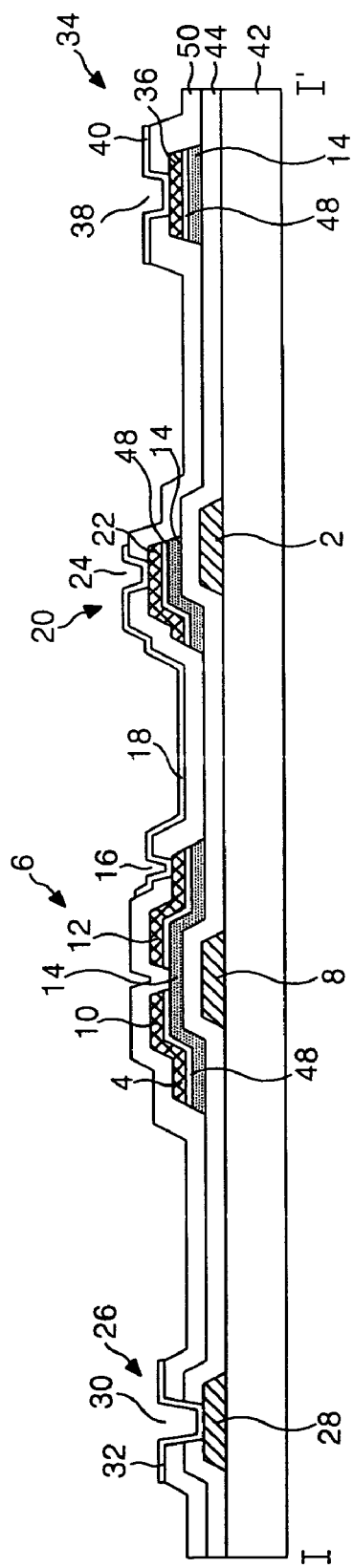
Figure 4A:
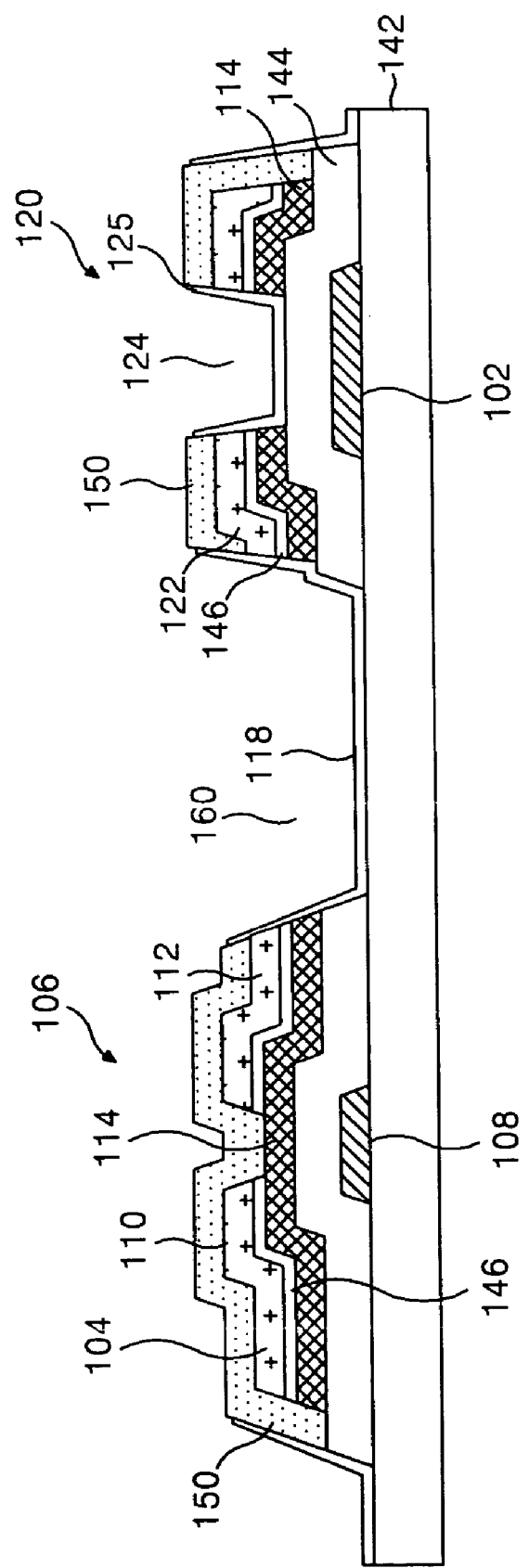
FIGS. 4A and 4B illustrate sectional views of display and non-display areas, respectively, resulting from the application of a third mask process used to fabricate a TFT substrate.
Figure 4B:
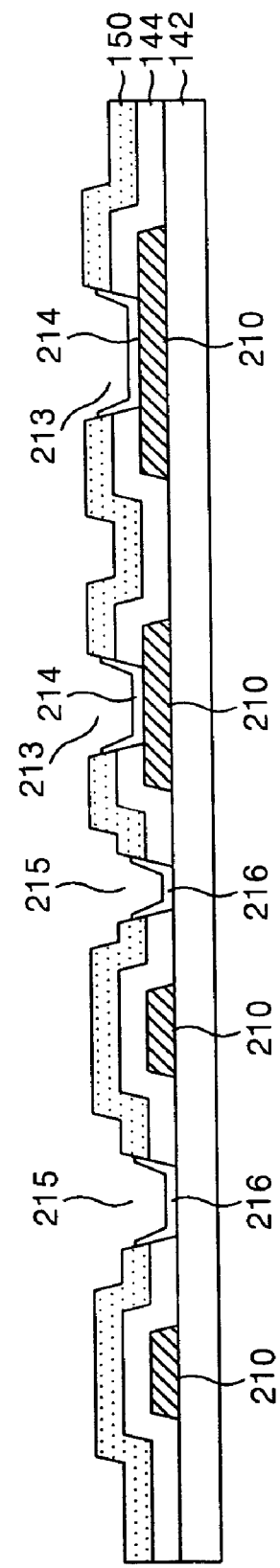

FIGS. 4A and 4B illustrate sectional views of display and non-display areas, respectively, of a TFT substrate resulting from the application of the third mask process of the aforementioned three-mask process.

Referring to FIG. 4A, the display area of a related art TFT substrate, fabricated in a manner similar to the three-mask process disclosed in U.S. patent application Ser. No. 10/969,869, includes a TFT 106 and a pixel electrode 118 disposed within a pixel area defined by the crossing of gate and data lines 102 and 104, respectively. The TFT substrate also includes a storage capacitor 120.

The TFT 106 includes a gate electrode 108 connected to a gate line 102, a source electrode 110 connected to a data line 104, a drain electrode 112 opposing the source electrode 110 and connected to the pixel electrode 118, an active layer 114 overlapping the gate electrode 108 and a portion of a gate insulating film 144 to form a channel between the source and drain electrodes 110 and 112, and an ohmic contact layer 146 between the source and drain electrodes 110 and 112 and the active layer 114.

A pixel hole 160 is aligned within the pixel area and is formed through a passivation film 150 and the gate insulating film 144. The pixel electrode 118 is disposed within the pixel hole 160 and contacts a side surface of the drain electrode 112 that is exposed by the pixel hole 160.

The storage capacitor 120 includes first and second upper storage electrodes 122 and 125, respectively, which overlap a previous gate line 102 and are separated from the previous gate line 102 by the gate insulating film 144 and the ohmic contact and active layers 1146 and 114. A first sidewall of the first upper storage electrode 122 contacts the pixel electrode 118 and the second upper storage electrode 125 is formed within a first contact hole 124 formed through the ohmic contact layer 146, the active layer 114, and the first storage upper electrode 122. Moreover, the second upper storage electrode 125 contacts a second sidewall of the first upper storage electrode 122.

Referring to FIG. 4B, the non-display area of the related art TFT substrate, fabricated in a manner similar to the three-mask process disclosed in U.S. patent application Ser. No. 10/969,869, includes a plurality of line-on-glass (LOG) signal lines 210 that transmit power and gate control signals from a data tape carrier package (TCP), on which a data driver is mounted, to a gate TCP, on which a gate driver is mounted. Further, stripper penetration paths herein provided as first and second groups of slits 213 and 215, respectively, within the passivation and gate insulating films 150 and 144, respectively, are formed over and between LOG signal lines 210, respectively. Moreover, first and second groups of dummy transparent conductive patterns 214 and 216, respectively, remain after performing the aforementioned lift-off process.

FIGS. 5A to 5D illustrate sectional views specifically explaining the third mask process shown in FIGS. 4A and 4B.

Figure 5A:
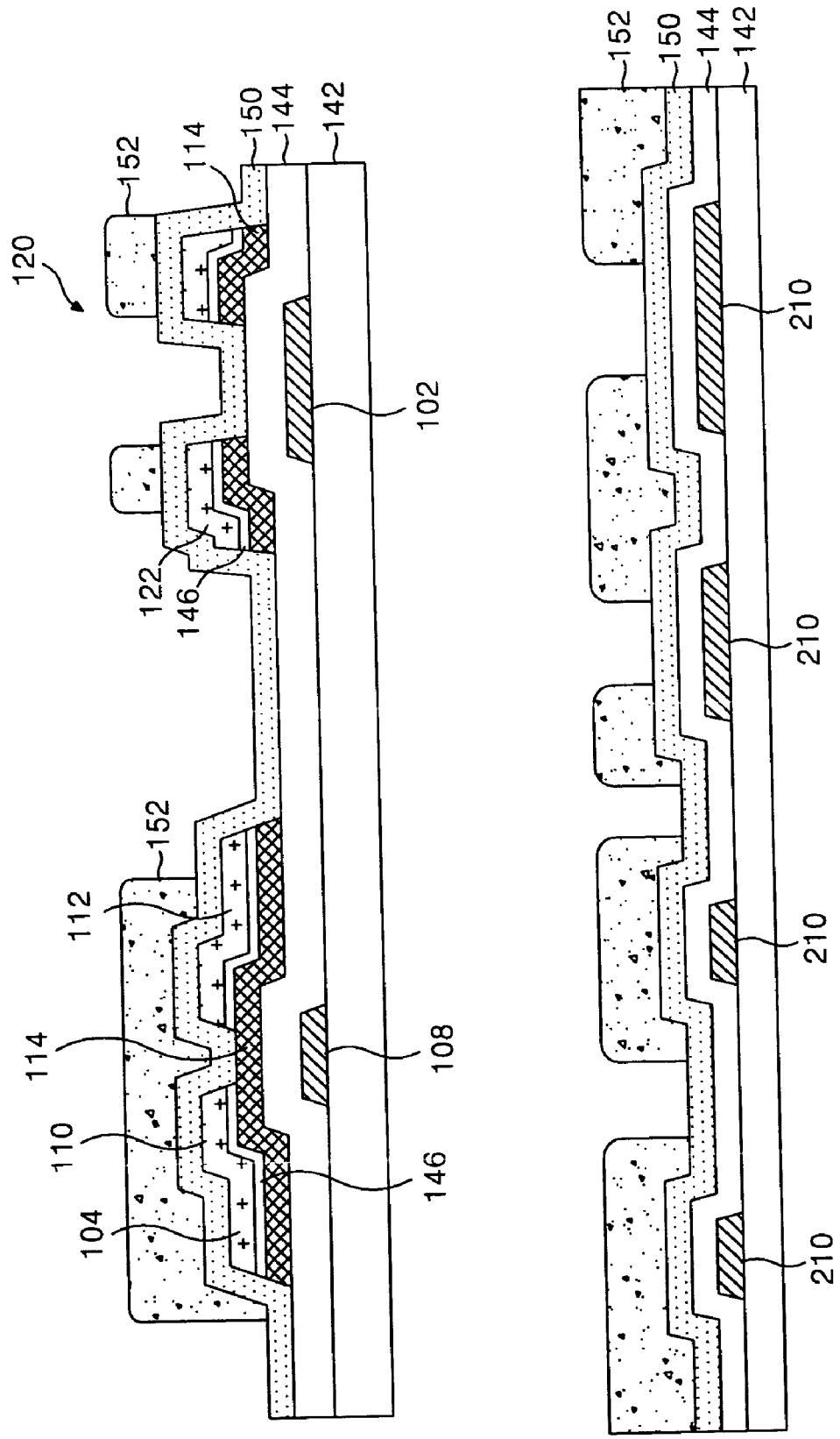
FIGS. 5A to 5D illustrate sectional views specifically explaining the third mask process shown in FIGS. 4A and 4B.

Referring to FIG. 5A, the aforementioned third mask process generally begins with the sequential formation of the passivation film 150 and a photo-resist film over the entire surface of the substrate 142, and on the gate insulating film 144, a previously formed gate metal pattern, and previously formed semiconductor and data metal patterns. Generally, the gate metal pattern includes the gate line 102, the gate electrode 108, and the LOG signal lines 210 and is formed in a first mask process. Moreover, the semiconductor pattern includes the active layer 114 and the ohmic contact layer 146 while the data metal pattern includes the data line 104, the source electrode 110, the drain electrode 112, and the first upper storage electrode 122, wherein both the semiconductor and data metal patterns are formed in a second mask process. Using a third mask (not shown), the photo-resist film is patterned to form a photo-resist pattern 152.

Figure 5B:
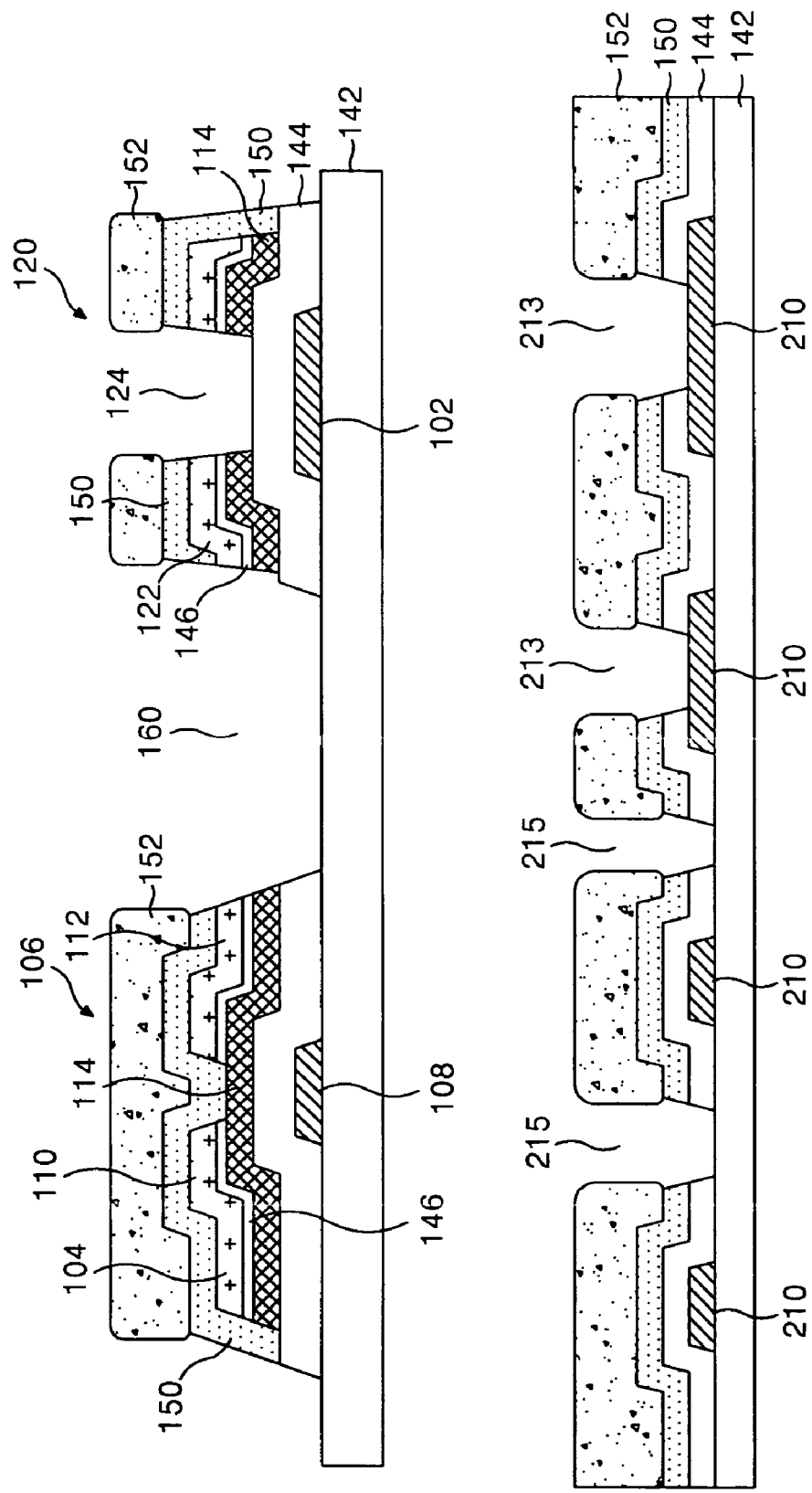

Subsequently, and as shown in FIG. 5B, the pixel hole 160 and first and second groups of slits 213 and 215 are variously formed within the passivation and/or gate insulating films 150 and 144 and the first contact hole 124 is formed through the passivation film 150 and the semiconductor pattern in an etching process using the photo-resist pattern 152 as a mask. During the etching process, the passivation film 150 is over-etched and, as a result, portions of the photo-resist pattern 152 that surround the pixel and first contact holes 160 and 124 and the first and second groups of slits 213 and 215.

Figure 5C:
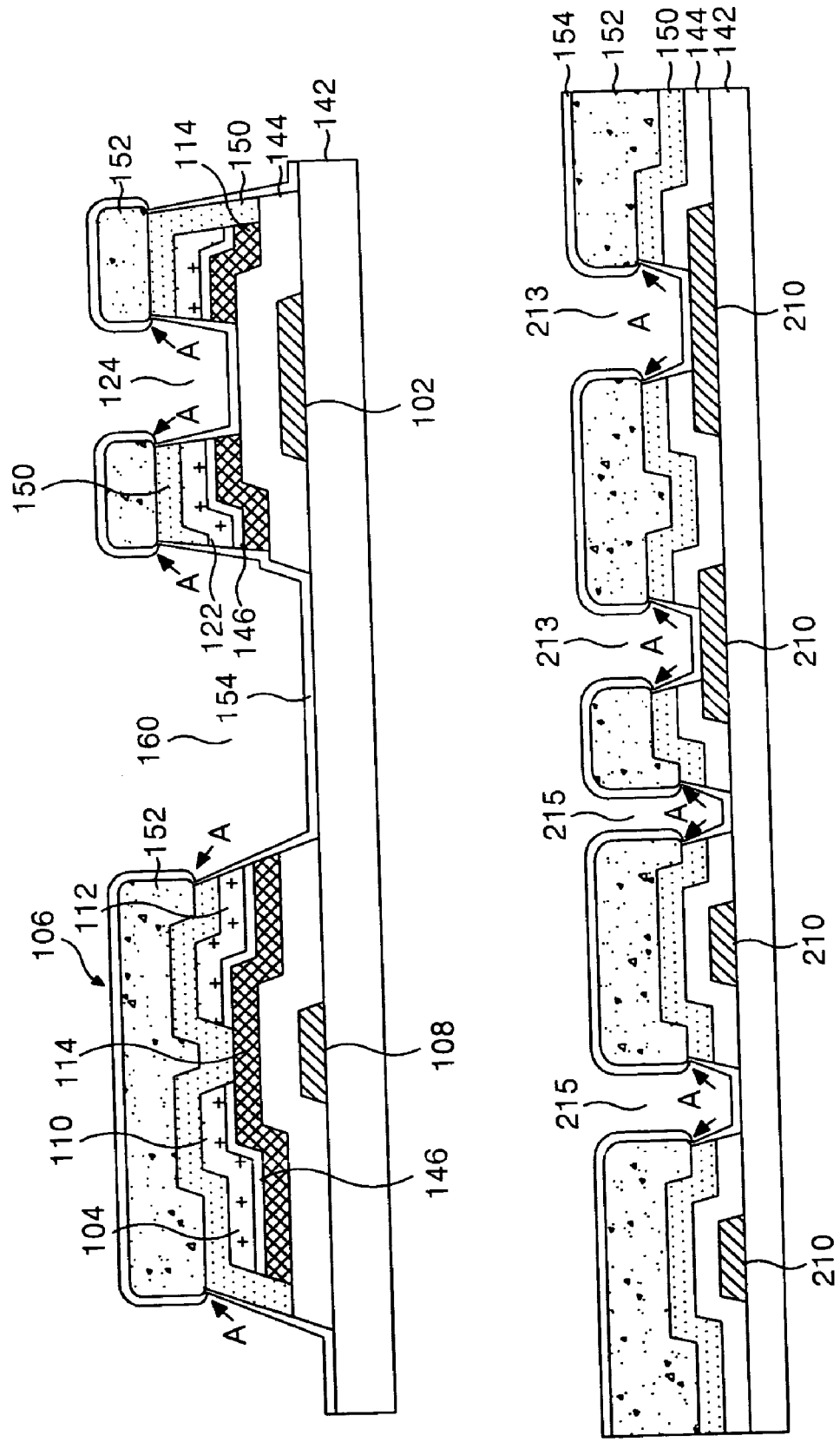
Figure 5D:
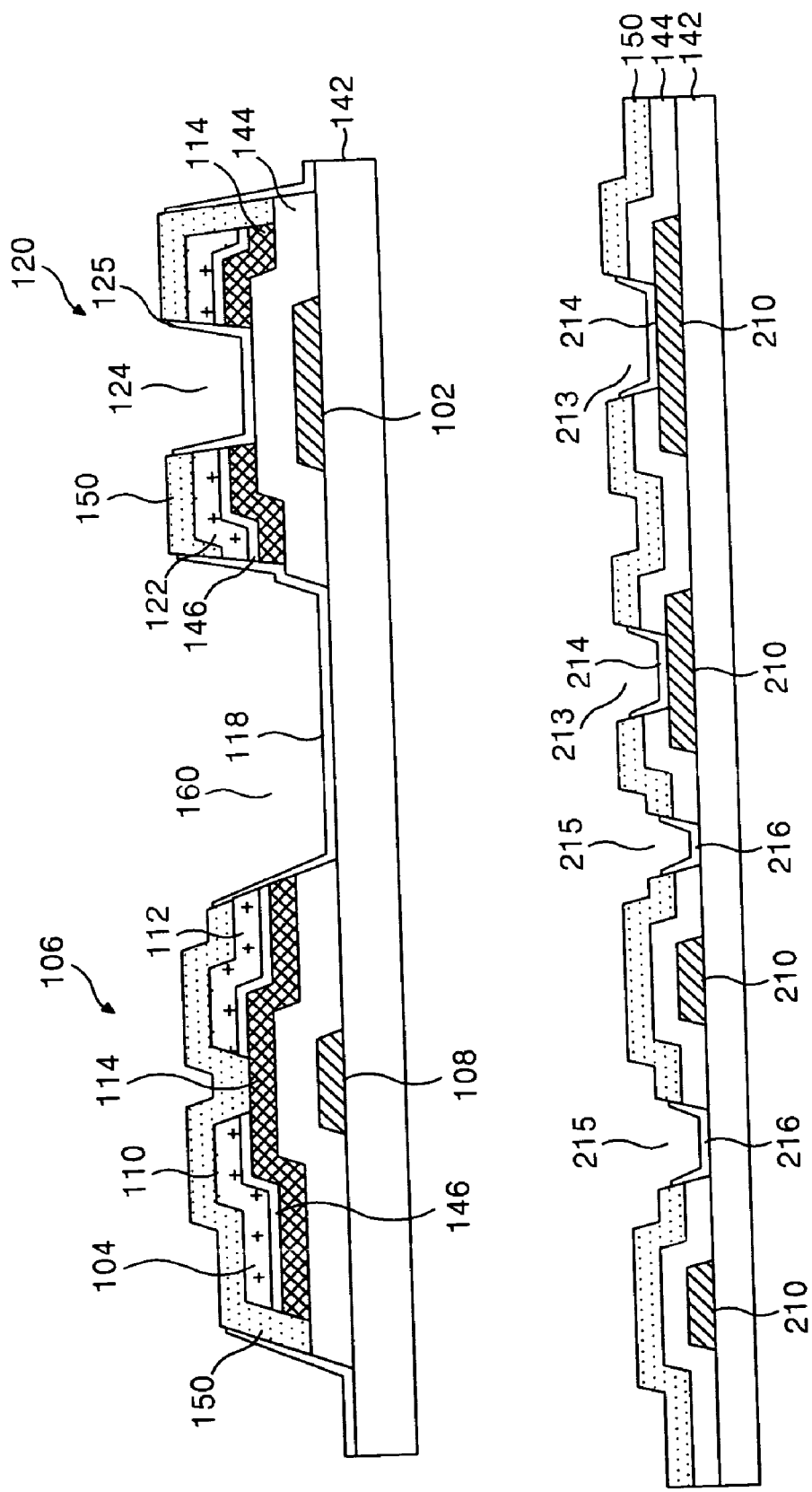

Referring to FIG. 5C, a transparent conductive film 154 is deposited via a deposition process such as sputtering over the photo-resist pattern 152, within the pixel and first contact holes 160 and 124, respectively, and within the first and second groups of slits 213 and 215, respectively. Subsequent to removing the photo-resist pattern 152 according to a lift-off process, the pixel electrode 118, the second storage upper electrode 125, and the first and second groups of dummy transparent conductive patterns 214, 216 are simultaneously formed as shown in FIG. 5D.

Referring back to FIG. 5C, the stripper penetration path is generally present at regions "A", as illustrated at an interface of the photo-resist pattern 152 and sidewalls of the passivation film 150 that define the pixel and first contact holes 160 and 124 and the first and second groups of slits 213 and 215 due to the generally protruded shape of portions of the photo-resist pattern 152 that surround the pixel and first contact holes 160 and 124 and the first and second groups of slits 213 and 215. Specifically, due to the nature of the sputtering process, the transparent conductive film 154 is not coated onto the lower portions of the photo-resist pattern 152 having the generally protruded shape. As a result, a stripper solution may penetrate into the photo-resist pattern 152 more easily where the transparent conductive film 154 is absent, thereby increasing the efficiency with which the photo-resist pattern is removed both in the display area and in the non-display area of the TFT array substrate.

To increase the efficiency with which TFT array substrates are fabricated, multiple TFT array substrates may be fabricated on a single base substrate and may then be separated from each other to form the TFT array substrates shown in FIGS. 4A and 4B, wherein the substrate 142 constitutes a portion of the original base substrate. Individual TFT array substrates are separated from each other within the base substrate by dummy areas. Accordingly, dummy areas are provided between non-display regions of adjacently formed TFT array substrates. While stripper penetration paths facilitate removal of the photo-resist pattern formed over display and non-display areas of individual TFT array substrates as they are formed on the base substrate, stripper penetration paths are not formed in the dummy areas of the base substrate. Accordingly, portions of the photo-resist film may remain over the dummy areas and decrease the efficiency with which subsequent processes (e.g., bonding processes) are performed across the entire base substrate.

Figure 7:
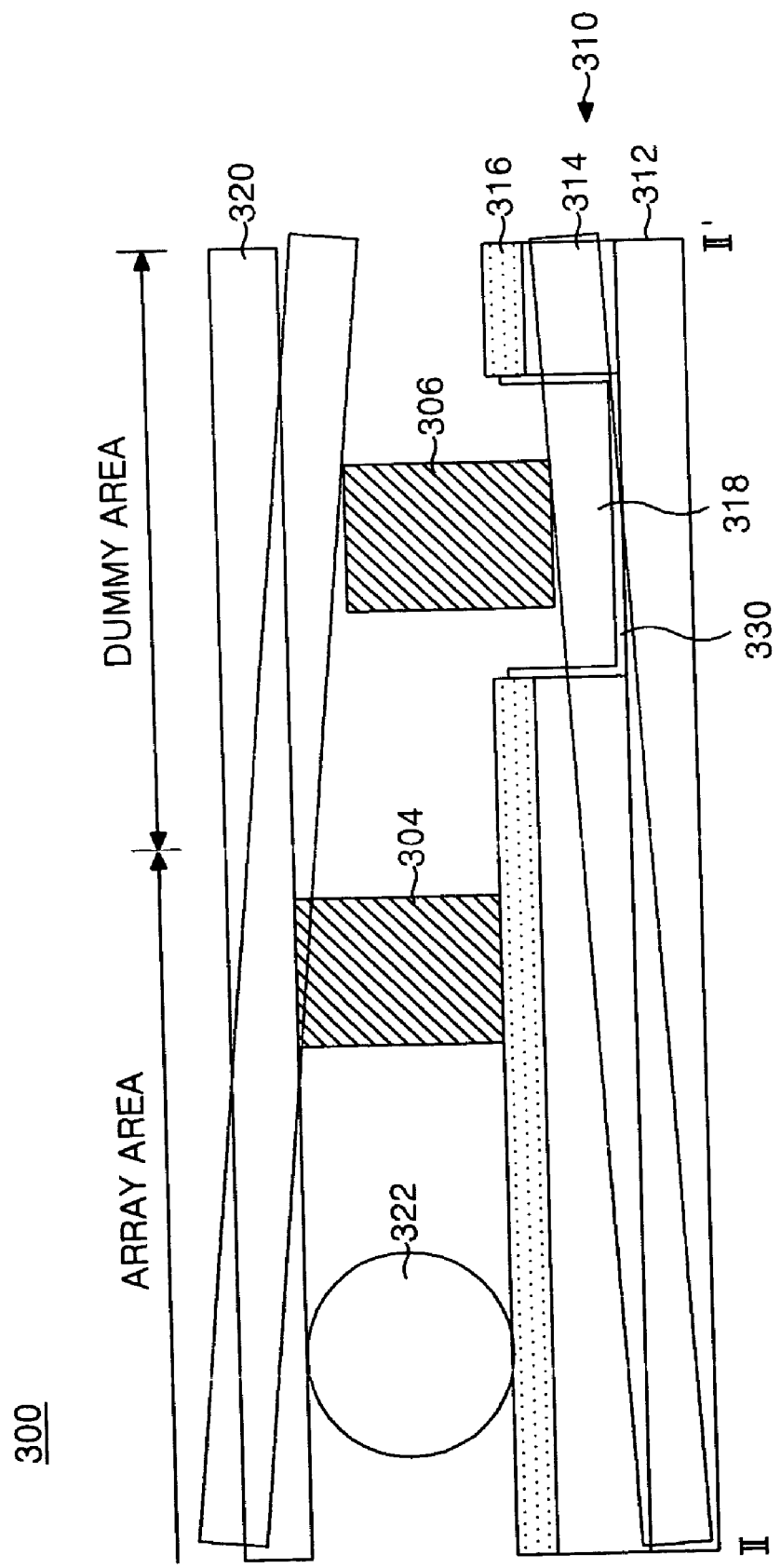
FIG. 7 illustrates a sectional view of the bonded base TFT array and color filter substrates, taken along the line II-II' as shown in FIG. 6.

FIG. 6 illustrates a plan view of a base TFT array substrate bonded to a base color filter substrate according to a first embodiment of the present invention. FIG. 7 illustrates a sectional view of the bonded base TFT array and color filter substrates, taken along the line II-II' as shown in FIG. 6.

Referring to FIGS. 6 and 7, a plurality of unit LCD panels 302 may be provided within a bonded substrate assembly 300 comprising a base TFT array substrate 310 bonded to a base color filter substrate 320. For example, the base TFT substrate 310 may include a plurality of TFT arrays and the base color filter substrate 320 may include a plurality of color filter arrays. When the base TFT array and color filter substrates 310 and 320 are aligned, they may be bonded together to form a plurality of unit LCD panels 302. In one aspect of the present invention, each unit LCD panel 302 may, for example, include a display area and a non-display area (herein collectively referred to as an array area). In another aspect of the present invention, the display area of each unit LCD panel may for example, include the structures formed as discussed and illustrated in FIGS. 4A to 5D. In still another aspect of the present invention, the non-display area of each unit LCD panel may for example, include the structures formed as discussed and illustrated in FIGS. 4B to 5D.

According to principles of the present invention, the base TFT array and color filter substrates 310 and 320 may be bonded together via sealant material. In one aspect of the present invention, main sealant patterns 304 may be provided around at least a portion of the display area of each unit LCD panel 302. In another aspect of the present invention, dummy sealant patterns 306 may be provided in dummy areas between array areas of adjacent unit LCD panels 302 and may function to maintain uniformity of the cell gap within each of the unit LCD panels 302. In still another aspect of the present invention, spacers 322 may be provided within the display areas of the unit LCD panels 302 to further maintain uniformity of the cell gap within each of the unit LCD panels 302.

According to principles of the present invention, the base TFT substrate 310 may be exemplarily formed according to the three-mask process described above with respect to FIGS. 5A to 5D and may thus incorporate a lift-off technique to simultaneously pattern a transparent conductive film and remove a photo-resist pattern. In one aspect of the invention, apertures 318 may be formed through portions of the passivation and gate insulating films 316 and 314, respectively, to create the aforementioned stripper penetration paths. In another aspect of the invention, the apertures 318 may be formed within the aforementioned dummy areas between array areas of adjacent unit LCD panels. In still another aspect of the present invention, the apertures 318 may be formed simultaneously with the formation of the various pixel and contact holes formed at the display and non-display areas of each unit LCD panel 302. Due to presence of apertures 318, the aforementioned third mask process may be efficiently completed across the entire base TFT array substrate 310.

According to principles of the present invention, a transparent conductive film may be coated over the photo-resist pattern that is used in the aforementioned third mask process to form the apertures 318. Accordingly, after the photo-resist pattern is removed via the lift-off process, a dummy transparent conductive pattern 330 remains within the apertures 318 and contacts a lower substrate 312 of the base TFT array substrate 310.

According to principles of the present invention, the main and dummy sealant patterns 304 and 306 have substantially the same thickness. In one aspect of the present invention, the main and dummy sealant patterns 304 and 306 may both be formed on the base TFT array substrate 310 or on the base color filter substrate 320. In another aspect of the present invention, one of the main and dummy sealant patterns 304 and 306 may be formed on one of the base TFT array substrate 310 and the base color filter substrate 320 while the other of the main and dummy sealant patterns 304 and 306 are formed on the other of the base TFT array substrate 310 and the base color filter substrate 320.

Regardless of which substrate the main and dummy sealant patterns 304 and 306 are formed on, the dummy sealant patterns 306 are aligned with the apertures 318 formed in the passivation and gate insulating films 316 and 314. Accordingly, a step difference may potentially occur between the main and dummy sealant patterns 304 and 306. When a step difference does occur, excessive pressure may be applied to the main sealant pattern 304 when the base TFT array substrate 310 is bonded to the color filter substrate 320, particularly if the bonding is carried out at an elevated temperature (e.g., in a hot-pressing process). Moreover, the base TFT array and/or base color filter substrates 310 and 320 may become deflected, thereby increasing or decreasing the cell gap of the display area surrounded by the main sealant pattern 304 or even cause the cell gap to be non-uniform.

To prevent the occurrence of such potential disadvantages, and with reference to FIGS. 8 and 9, a base TFT array substrate 310' may be fabricated similarly to the base TFT array substrate 310 discussed above with respect to FIGS. 6 and 7 but may be fabricated to further include support posts 340 that support the dummy sealant patterns 306.

For example, the base TFT substrate 310' may be exemplarily formed according to the three-mask process described above that incorporates a lift-off technique to simultaneously pattern a transparent conductive film and remove a photo-resist pattern. In one aspect of the invention, apertures 338 may be formed through portions of the passivation and gate insulating films 316 and 314, respectively, to create the aforementioned stripper penetration paths. In another aspect of the invention, the apertures 338 may be formed within the aforementioned dummy areas between array areas of adjacent unit LCD panels 302. In still another aspect of the present invention, the apertures 338 may be formed simultaneously with the formation of the various pixel and contact holes formed at the display and non-display areas of each unit LCD panel 302. Thus, the apertures 338 may facilitate completion of the aforementioned third mask process across the entire base TFT array substrate 310'.

According to principles of the present invention, the base TFT array substrate 310' may further include at least one of support post 340 arranged within the apertures 338, and a plurality of holes 341 formed within the support post 340. In one aspect of the present invention, the support post 340 and the holes 341 may be formed simultaneously with the formation of the apertures 338. In another aspect of the present invention, the support post 340 may contact a lower surface of dummy sealant pattern 306. In still another aspect of the present invention, a width of each hole 341 may be less than a width of the dummy sealant pattern 306.

As similarly discussed above with respect to FIGS. 6 and 7, the main and dummy sealant patterns 304 and 306 may have substantially the same thickness. In one aspect of the present invention, the main and dummy sealant patterns 304 and 306 may both be formed on the base TFT array substrate 310 or on the base color filter substrate 320. In another aspect of the present invention, one of the main and dummy sealant patterns 304 and 306 may be formed on one of the base TFT array substrate 310' and the base color filter substrate 320 while the other of the main and dummy sealant patterns 304 and 306 are formed on the other of the base TFT array substrate 310' and the base color filter substrate 320.

Regardless of which substrate the main and dummy sealant patterns 304 and 306 are formed on, the dummy sealant patterns 306 may be aligned with the support post 340 arranged within the apertures 338 that are formed in the passivation and gate insulating films 316 and 314, respectively. Accordingly, the dummy sealant patterns 306 may be supported by portions of the passivation and gate insulating films 316 and 314 of the support post 340 such that substantially no step difference occurs between the main and dummy sealant patterns 304 and 306. As a result, the uniformity of the cell gap between the base TFT array and color filter substrates 310' and 320 may be substantially maintained due to the support of the dummy sealant 306 by the support post 340.

Having described the TFT array substrate 310' with respect to FIGS. 8 and 9, a method of its fabrication according to principles of the present invention will now be described in greater detail with reference to FIGS. 10A to 10D.

Figure 10A:
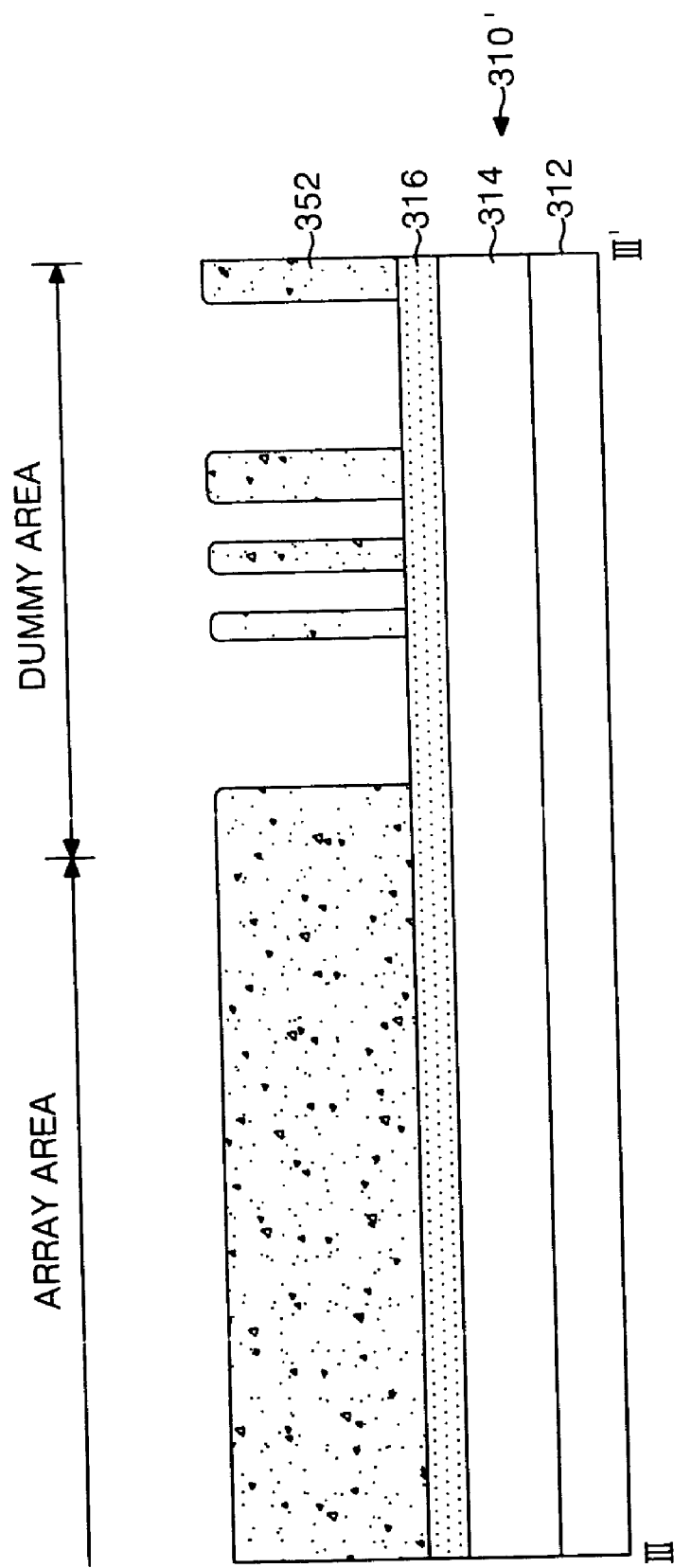
FIGS. 10A to 10D illustrate sectional diagrams specifically explaining a third mask process of the thin film transistor substrate shown in FIG. 9.

Referring to FIG. 10A, a passivation film 316 may be formed over the entire surface of the gate insulating film 314 via a deposition technique such as PECVD, spin coating, or the like. A photo-resist film may then be formed over the entire surface of the passivation film 316 and may be photolithographically patterned using a third mask pattern. Using the third mask pattern, the photo-resist film may be selectively exposed to, for example, ultraviolet (UV) light, thereby creating a photo-resist pattern 352 having open portions aligned over regions where apertures 338 and holes 341 will subsequently be formed.

Figure 10B:
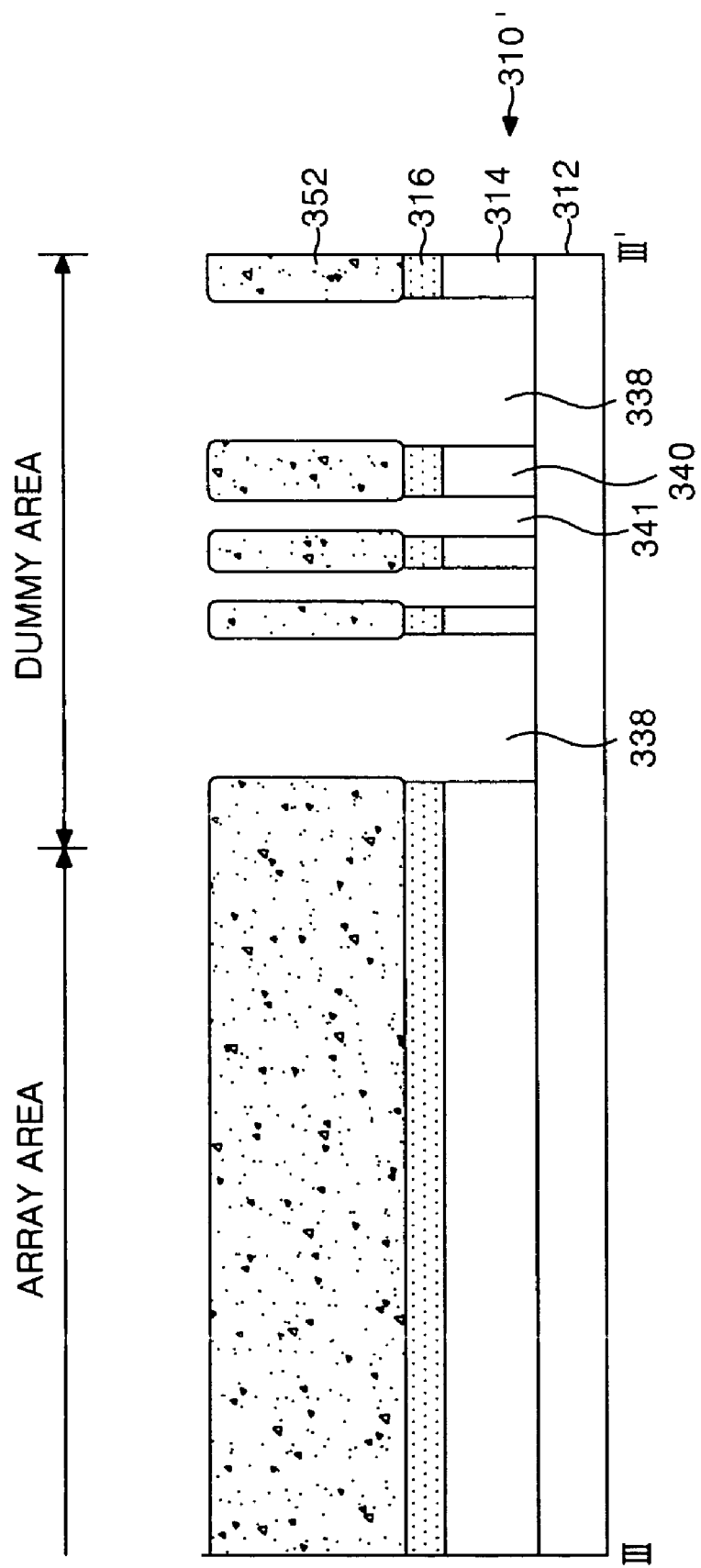

Referring to FIG. 10B, the passivation film 316 and the gate insulating film 314 may be patterned via an etching process using the photo-resist pattern 352 as a mask to form the apertures 338 and the holes 341.

Figure 10C:
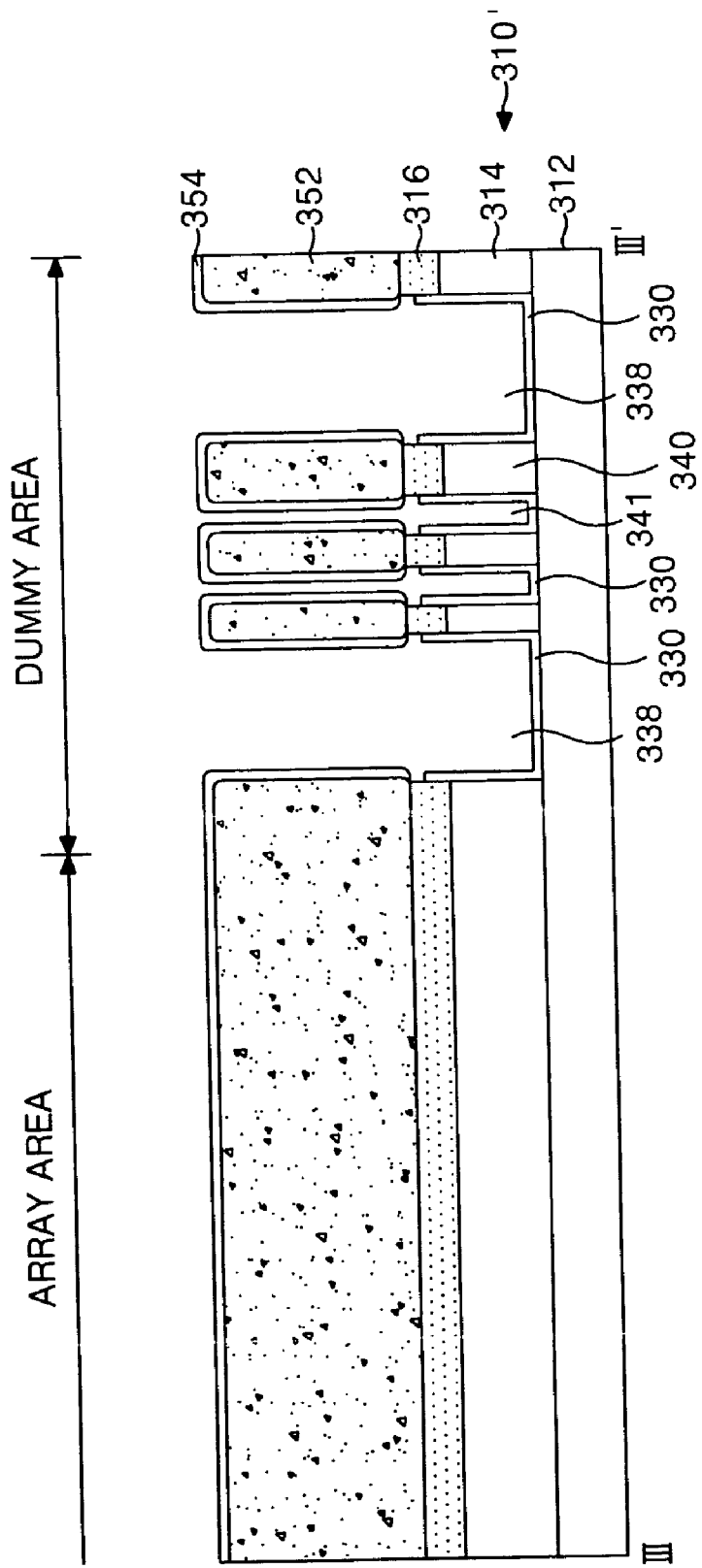

Referring to FIG. 10C, a transparent conductive material 354 may be formed over the photo-resist pattern 352 and on the topography formed below (e.g., on the sidewalls of the passivation and gate insulating films 316 and 314, respectively, that define the apertures 338 and the holes 341 within the support post 340. As shown, the transparent conductive material 354 may be formed such that substantially no material is formed on the lower portions of the protruded edge regions of the photo-resist pattern 352, thereby improving the efficiency of a subsequent lift-off process. In one aspect of the present invention, the transparent conductive material 354 may be formed via a deposition technique such as sputtering, or the like. In another aspect of the present invention, the transparent conductive material 354 may, for example, include a material such as ITO, TO, IZO, indium oxide (IO), or the like, or combinations thereof.

Figure 10D:
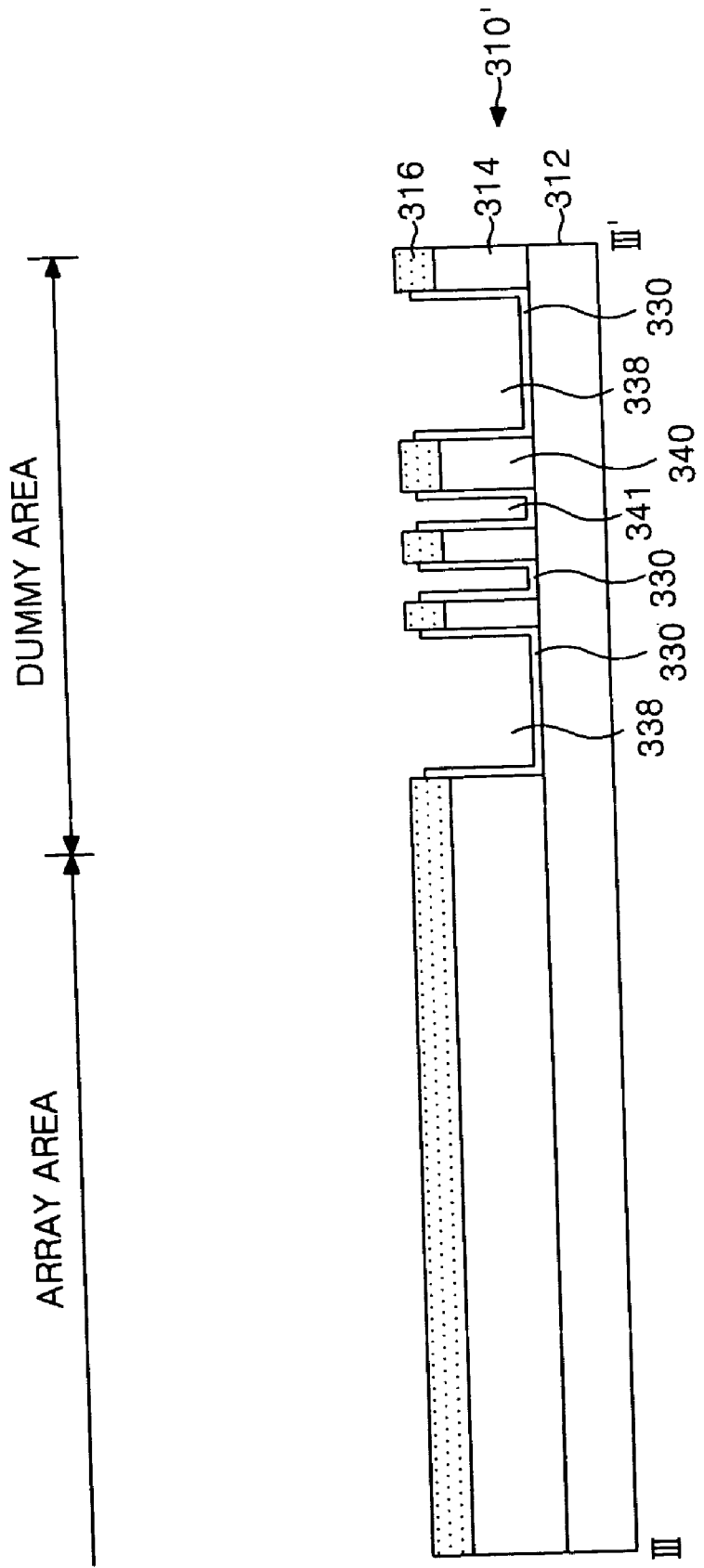

Referring to FIG. 10D, the photo-resist pattern 352 and portions of the transparent conductive material 354 formed thereon may be simultaneously removed in a lift-off process, thereby forming a transparent conductive patterns 330 within the apertures 338 and the holes 341. Accordingly, transparent conductive patterns 330 contact the sidewalls of the passivation and gate insulating films 316 and 314 that define the apertures 338 and the holes 341.

Subsequently, and with reference to FIG. 9, the base TFT array substrate 310' shown in FIG. 10D may be bonded to a base color filter substrate 320. According to principles of the present invention, the base TFT array and color filter substrates 310' and 320 may be bonded together via main and dummy sealant patterns 304 and 306. In one aspect of the present invention, the main and dummy sealant patterns 304 and 306 may have substantially the same thickness. In another aspect of the present invention, the main and dummy sealant patterns 304 and 306 may both be formed on the base TFT array substrate 310' or on the base color filter substrate 320. In another aspect of the present invention, one of the main and dummy sealant patterns 304 and 306 may be formed on one of the base TFT array substrate '310 and the base color filter substrate 320 while the other of the main and dummy sealant patterns 304 and 306 are formed on the other of the base TFT array substrate 310 and the base color filter substrate 320.

As described above, the principles of the present invention provide a base TFT substrate and a method of fabricating the same wherein, for example, apertures are formed through portions of the passivation and gate insulating films arranged within dummy areas between array areas of adjacent LCD panels that are, in turn, formed in a pair of bonded base substrates. By providing such apertures, stripper penetration paths may be arranged within the dummy areas to facilitate completion of a mask process across the entire base TFT array substrate in which a photo-resist pattern is removed while a conductive film is simultaneously patterned.

As additionally discussed above, the principles of the present invention may provide a plurality of posts arranged within the apertures and aligned, for example, with at least a portion of a subsequently provided dummy seal pattern. By providing such posts, a step difference between main and dummy sealant patterns may be substantially eliminated, thereby ensuring a substantially uniform cell gap between the bonded base TFT array and color filter substrates.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A base thin film transistor (TFT) array substrate, comprising:
   a substrate;
   a plurality of array areas on the substrate;
   at least one dummy area on the substrate and between the plurality of array areas;
   an insulating film on the substrate;
   at least one aperture through the insulating film and arranged within the at least one dummy area; and
   at least one post arranged within the at least one aperture, wherein the at least one aperture includes a plurality of holes.

2. The base TFT array substrate of claim 1, wherein the at least one post comprises insulating material.

3. The base TFT array substrate of claim 2, wherein the at least one post includes:
   a gate insulating film; and
   a passivation film.

4. The base TFT array substrate of claim 1, further comprising a dummy sealant pattern on the at least one post.

5. The base TFT array substrate of claim 1, further comprising a transparent conductive material formed within the plurality of holes and the aperture.

6. The base TFT array substrate of claim 1, wherein a width of each hole is less than a width of the dummy sealant pattern formable over the at least one aperture.

7. The base TFT array substrate of claim 1, further comprising a plurality of TFTs within each array area.

\* \* \* \* \*